Jan. 23, 1923.
DeSOTO E. RICHARDSON.
FRUIT PICKING DEVICE.
FILED JAN. 17, 1922.
1,442,827
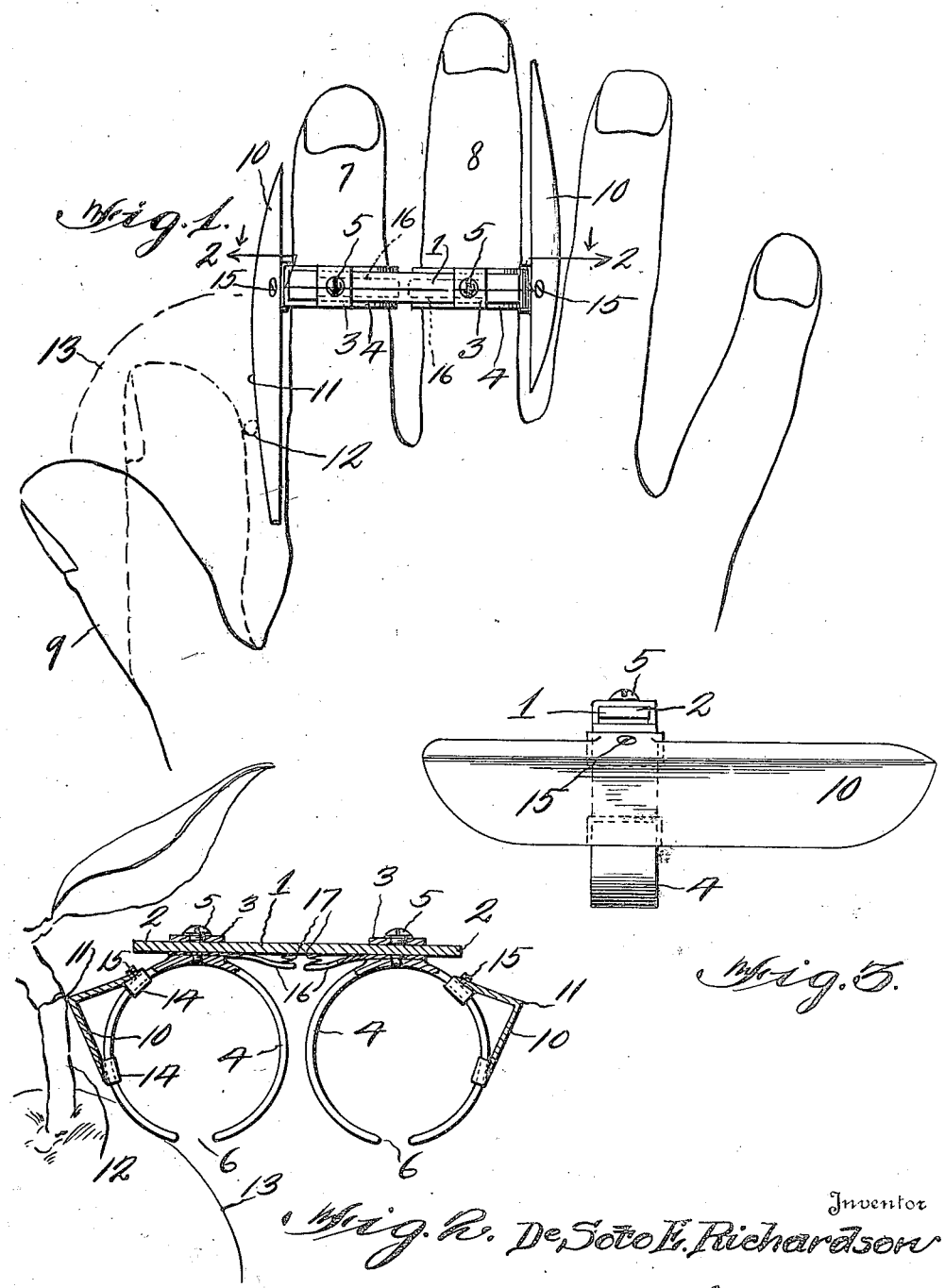

Patented Jan. 23, 1923.

1,442,827

UNITED STATES PATENT OFFICE.

DE SOTO E. RICHARDSON, OF RIVERSIDE, WASHINGTON.

FRUIT-PICKING DEVICE.

Application filed January 17, 1922. Serial No. 529,855.

*To all whom it may concern:*

Be it known that I, DE SOTO E. RICHARDSON, a citizen of the United States, residing at Riverside, in the county of Okanogan, State of Washington, have invented a new and useful Fruit-Picking Device; and I do hereby declare the following to be a full, clear, and exact description of the invention, such as will enable others skilled in the art to which it appertains to make and use the same.

The invention relates to fruit picking devices and has for its object to provide a device of this character comprising flexible split rings adapted to receive either the thumb or the first and second fingers or first and third fingers of a fruit picker, said split rings being adjustably mounted and connected together by a bar and having angularly shaped breaking devices adjustably mounted on the rings, and having a ridge against which the stem of an apple or the like may be forced and broken.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a rear view of the device showing the same in position for use.

Figure 2 is a sectional view through the device taken on line 2—2 of Figure 1.

Figure 3 is a side elevation of the device.

Referring to the drawings, the numeral 1 designates the connecting bar, the ends 2 of which extend through yokes 3 of finger engaging rings 4 and are held in said yokes by means of set screws 5. The finger engaging rings 4 are split as at 6, and are formed from slightly flexible material, thereby allowing the rings to spread according to the size of the first and second fingers 7 and 8 when the device is disposed on said fingers or the size of the thumb 9 when the device is carried by the thumb. The applying of the rings 4 to the various sizes of fingers is possible by the flexing of the same when the finger is forced through the ring. Mounted on the rings 4 are stem engaging members 10, which members are angularly shaped in horizontal cross section as clearly shown in Figure 2, thereby forming on each breaking member 10 a sharp corner 11, which corner is adapted to be forced into engagement the stem 12 of a piece of fruit 13 by means of the adjacent finger thereby facilitating and rendering easy the breaking of the stem 12. The breaker members 10 are provided with sleeves 14, which sleeves receive the rings 4 and are held in various adjusted positions thereon by means of set screws 15. The set screws 15 allow the breaker members 10 to be adjusted to various positions on the rings 4 according to the wishes of the operator.

The yokes 3 are provided with spring arms 16 between the ends of which and the bar 1 coiled springs 17 are interposed. The spring arms 16 and the coiled springs 17 form means whereby when the set screws 5 are loosened, the rings 4 will be held against displacement on the bar 1 during the tightening of the set screws 5.

From the above it will be seen that a stem breaking device is provided, which is simple in construction, may be applied to either the first and second or first and third fingers, or to the thumb of the operator and so constructed that the stem may be easily broken during a fruit picking operation.

The object of the fruit picking device is to prevent the stems from being pulled out of the fruit, and to eliminate the hurting of the fingers while picking the same.

All the metal parts of the fruit picking device are to be covered with a buffing material to prevent marring the fruit.

The invention having been set forth what is claimed as new and useful is:—

1. A finger carried fruit picking device comprising a bar, flexible split finger engaging rings carried by said bar, and a stem engaging member carried by said rings.

2. A finger carried fruit picking device comprising a bar, expansible finger engaging rings carried by said bar and adjustable thereon, spring means for holding said rings in various positions while they are being secured to the bar, stem engaging members carried by the rings, said stem engaging members being provided with sleeves slidably mounted on the rings.

3. A finger carried fruit picking device, said device comprising spaced expansible rings adapted to receive fingers of the operator, sleeves carried by said rings, a connecting bar extending through said sleeves, means whereby said sleeves may be secured to the bar and stem engaging members slidably mounted on the rings, and circumferentially adjustable on the rings.

In testimony whereof I have signed my name to this specification in the presence of two subscribing witnesses.

DE SOTO E. RICHARDSON.

Witnesses:
L. E. FRANK,
I. W. CHAPMAN.